(12) United States Patent
Yokota

(10) Patent No.: US 7,862,078 B2
(45) Date of Patent: Jan. 4, 2011

(54) SIDE COLLISION AIRBAG DEVICE

(75) Inventor: Masatoshi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 143 days.

(21) Appl. No.: 12/153,922

(22) Filed: May 28, 2008

(65) Prior Publication Data

US 2009/0072523 A1 Mar. 19, 2009

(30) Foreign Application Priority Data

Sep. 19, 2007 (JP) ............................. 2007-241746

(51) Int. Cl.
*B60R 21/207* (2006.01)
(52) U.S. Cl. .................. 280/730.2; 280/728.2
(58) Field of Classification Search .............. 280/730.2, 280/728.2; *B60R 21/207*
See application file for complete search history.

(56) References Cited

U.S. PATENT DOCUMENTS

| | | | |
|---|---|---|---|
| 7,364,194 B2 * | 4/2008 | Mabuchi et al. ............. | 280/741 |
| 7,384,062 B2 * | 6/2008 | Yokoyama et al. ........ | 280/730.2 |
| 2004/0090049 A1 * | 5/2004 | McCann et al. ........... | 280/728.2 |
| 2005/0161927 A1 * | 7/2005 | Yokoyama et al. ........ | 280/743.1 |
| 2006/0059713 A1 * | 3/2006 | Stockbridge et al. ........ | 36/30 R |
| 2006/0186644 A1 * | 8/2006 | Manire et al. ............. | 280/728.2 |
| 2007/0284862 A1 * | 12/2007 | Kashiwagi ................... | 280/740 |
| 2008/0088118 A1 * | 4/2008 | Wipasuramonton et al. ...... | 280/728.2 |

FOREIGN PATENT DOCUMENTS

JP 2005-225351 8/2005

* cited by examiner

*Primary Examiner*—Faye M. Fleming
*Assistant Examiner*—Keith Frisby
(74) *Attorney, Agent, or Firm*—Manabu Kanesaka

(57) ABSTRACT

A side collision airbag device includes an airbag to inflate and extend between a side wall portion of a vehicle and an occupant seated on a seat disposed in the vehicle. An inflator is connected to the airbag to spout a gas for inflating and extending the airbag from one side thereof in its longitudinal direction. A restricting member is attached for restricting a movement of the inflator toward the other side thereof in its longitudinal direction when the inflator is activated.

8 Claims, 5 Drawing Sheets

SIDE COLLISION AIRBAG DEVICE

BACKGROUND OF THE INVENTION AND RELATED ART STATEMENT

The present invention relates to a side collision airbag device for restraining an occupant upon a side collision or the like of automobiles and other vehicles.

The side collision airbag device is known that inflates the side collision airbag at a side of the occupant by means of an inflator and restrains the body of the occupant upon the side collision, a rollover, or the like of automobiles and other vehicles. The side collision airbag device is, for example, embedded in a back portion of a seat, and upon the side collision or the like, the side collision airbag inflates and extends from the back portion between the occupant and a side wall portion of the vehicle body by a gas injected from the inflator.

In the side collision airbag like this, the inflator is normally supported by a supporting member fixed to the side of the vehicle body using a bolt or the like.

Japanese Unexamined Patent Application Publication No. 2005-225351 (Patent Document 1) has disclosed a side collision airbag device like this. In this conventional art, the inflator is inserted in the supporting member (retainer) and is fixed by crimping the supporting member.

In the conventional art described above, as a basic configuration of the side collision airbag device, the inflator is supported by the supporting member fixed to the side of the vehicle body using the bolt or the like. When the side collision airbag device is optimized, it is necessary to keep the inflator fixed stably even in a case when the inflator is activated.

The object of the present invention is to provide a side collision airbag device that can keep the inflator fixed stably even in the case when the inflator is activated.

Further objects and advantages of the invention will be apparent from the following description of the invention.

SUMMARY OF THE INVENTION

In order to achieve the above object, the first aspect of the invention is that a side collision airbag device comprises a side collision airbag that inflates and extends between a side wall portion of a body of a vehicle and an occupant seated on a seat disposed in the body, an inflator that spouts a gas from one side thereof in its longitudinal direction, the gas inflating and extending the side collision airbag, and a restricting member for restricting a movement of the inflator toward the other side thereof in its longitudinal direction when the inflator is activated.

In the first aspect of the invention, when the inflator is activated, the gas is spouted from the one side of the inflator in its longitudinal direction, and thereby the side collision airbag inflates and extends between the side wall portion of the vehicle and the occupant.

At that time, in the first aspect of the invention, the movement of the inflator toward the other side thereof in its longitudinal direction is restricted by the restricting member. In this way, the inflator is restricted from moving (displacing, projecting or the like) toward the opposite side of a spouting direction of the gas due to a reaction force caused by a blowout of the gas. Therefore, the inflator can be kept to be fixed stably even in the case when the inflator is activated.

The second aspect of the invention is, in the first aspect of the invention, that the side collision airbag device further comprises a supporting member for supporting the inflator, wherein the restricting member is provided as a separate body from the supporting member.

Due to this configuration, it becomes possible to install the restricting member to the inflator of a conventional side collision airbag device which does not initially have a restricting member so as to have a function for restricting the movement of the inflator in a simple configuration.

The third aspect of the invention is, in the second aspect of the invention, that the restricting member is provided with a securing portion so as to cover at least a part of an end portion on the other side of the inflator in its longitudinal direction.

In the third aspect of the invention, the restricting member is provided with the securing portion so as to cover at least a part of the end portion on the other side of the inflator in its longitudinal direction. By this configuration, when the inflator is activated, the securing portion, which is in contact with the end portion on the other side of the inflator in its longitudinal direction, can prevent the inflator from moving (displacing, projecting or the like) toward the opposite side of the spouting direction of the gas.

The fourth aspect of the invention is that, in the third aspect of the invention, the restricting member has an elongated portion secured by fixing members for fixing the supporting members to the body of the vehicle, the elongated portion being elongated along the longitudinal direction of the inflator.

In the fourth aspect of the invention, the restricting member is secured to the inflator by securing the elongated portion of the restricting member using the fixing member for fixing the supporting member, for supporting the inflator, to the body of the vehicle. By this configuration, any fixing member for fixing the securing member to the vehicle side is not required to be separately provided, and the fixing structure can be simplified.

The fifth aspect of the invention is that, in the fourth aspect of the invention, the restricting member has a projecting portion provided so as to project toward the other side of the side where the inflator is disposed.

In the fifth aspect of the invention, the restricting member has the projecting portion that is projected toward the other side of the inflator. By this configuration, if a hole for confirming the projecting portion is formed at a position corresponding to that of the projecting portion in the side collision airbag and a casing for accommodating the airbag in a state of being folded, it becomes possible to confirm the projecting portion from the outside in a state that the inflator is inserted in the side collision airbag and in another state that the folded airbag having the inflator inserted therein is accommodated in the casing. As a result, it is prevented from forgetting to attach the restricting member.

The sixth aspect of the invention is that, in the fifth aspect of the invention, the side collision airbag device has a casing that accommodates a folded side collision airbag, the casing having a hole for confirming the projecting portion, and the hole is formed at a position corresponding to the projecting portion.

By this configuration, it becomes possible to confirm the projecting portion from the outside in the state that the folded side collision airbag having the inflator inserted therein is accommodated in the casing. As a result, it is prevented from forgetting to attach the restricting member.

According to the present invention, it is possible to keep the inflator fixed stably even in the case when the inflator is activated.

BRIEF DESCRIPTION OF THE DRAWINGS

FIGS. 4(a), 4(b) are perspective views of a stopper plate for restricting a movement of the inflator toward the other side in its longitudinal direction, wherein FIG. 4(a) is a perspective view of the stopper plate seen from one side in the longitudinal direction and FIG. 4(b) is a perspective view of the stopper plate seen from the other side in the longitudinal direction.

DETAILED DESCRIPTION OF PREFERRED EMBODIMENTS

Figure 1:
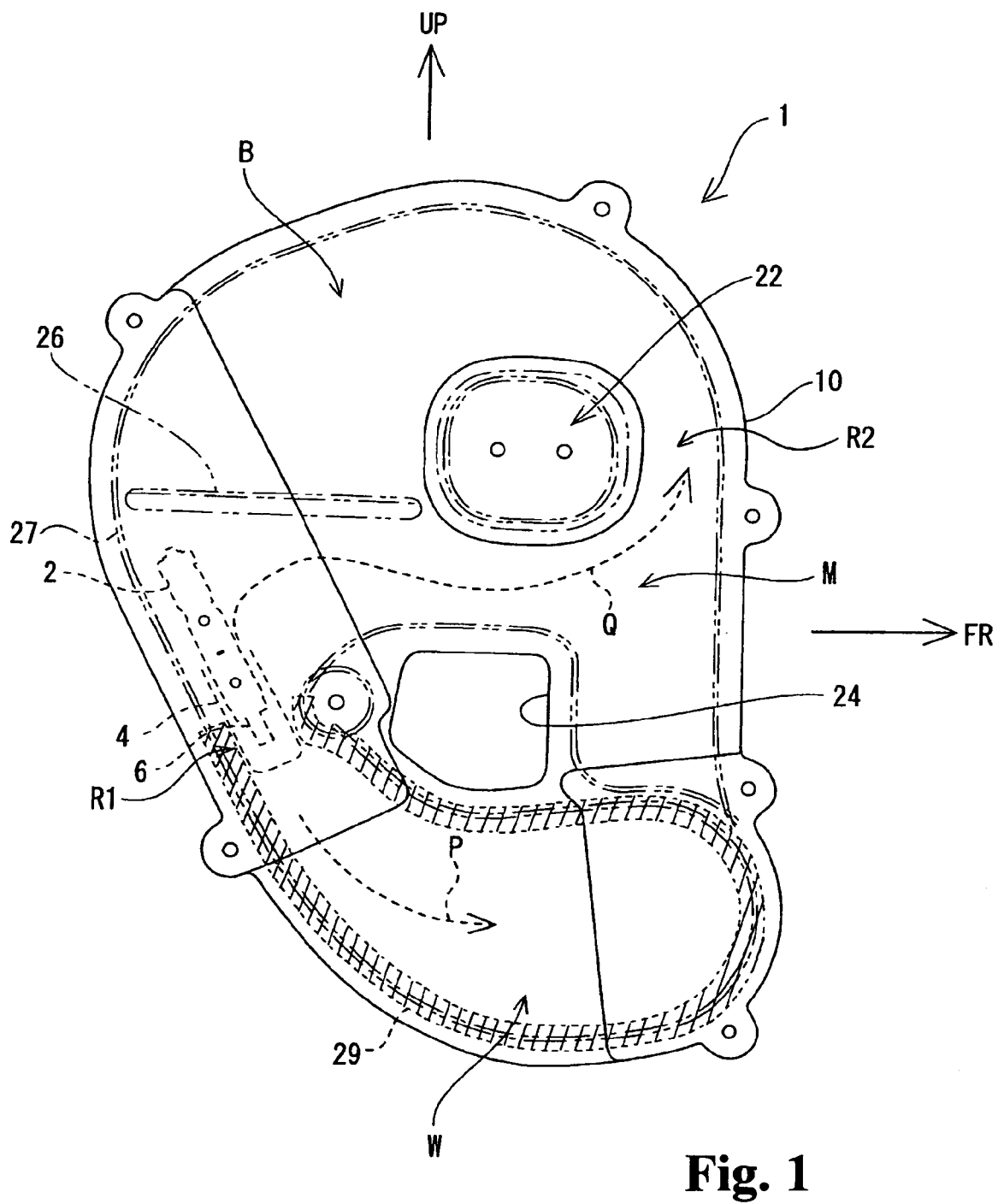
FIG. 1 is a developed plan view of the side collision airbag of an embodiment of the present invention.
Figure 2:
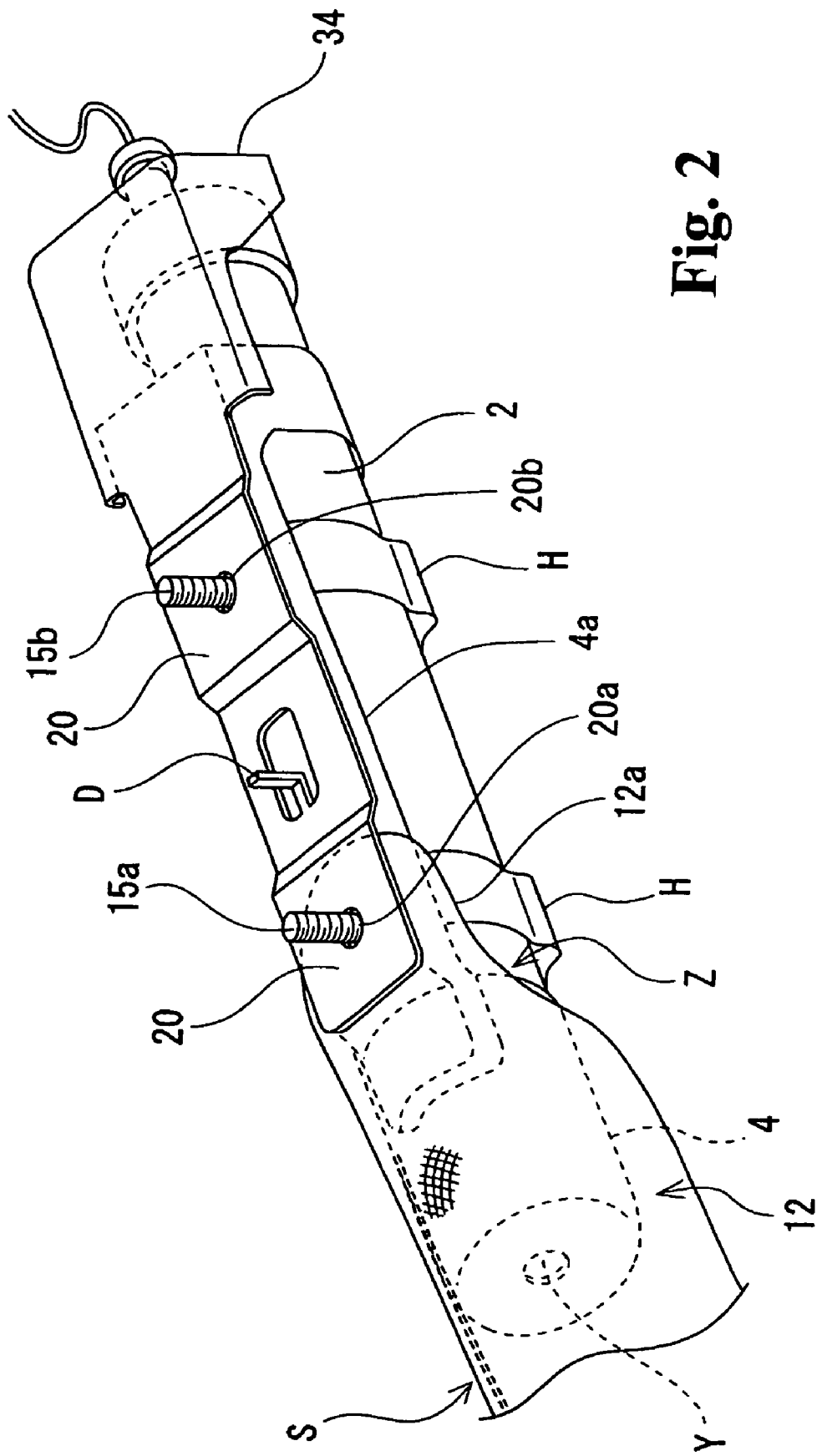
FIG. 2 is an overall perspective view of the inflator for inflating and extending the side collision airbag of the embodiment of the present invention.
Figure 3:
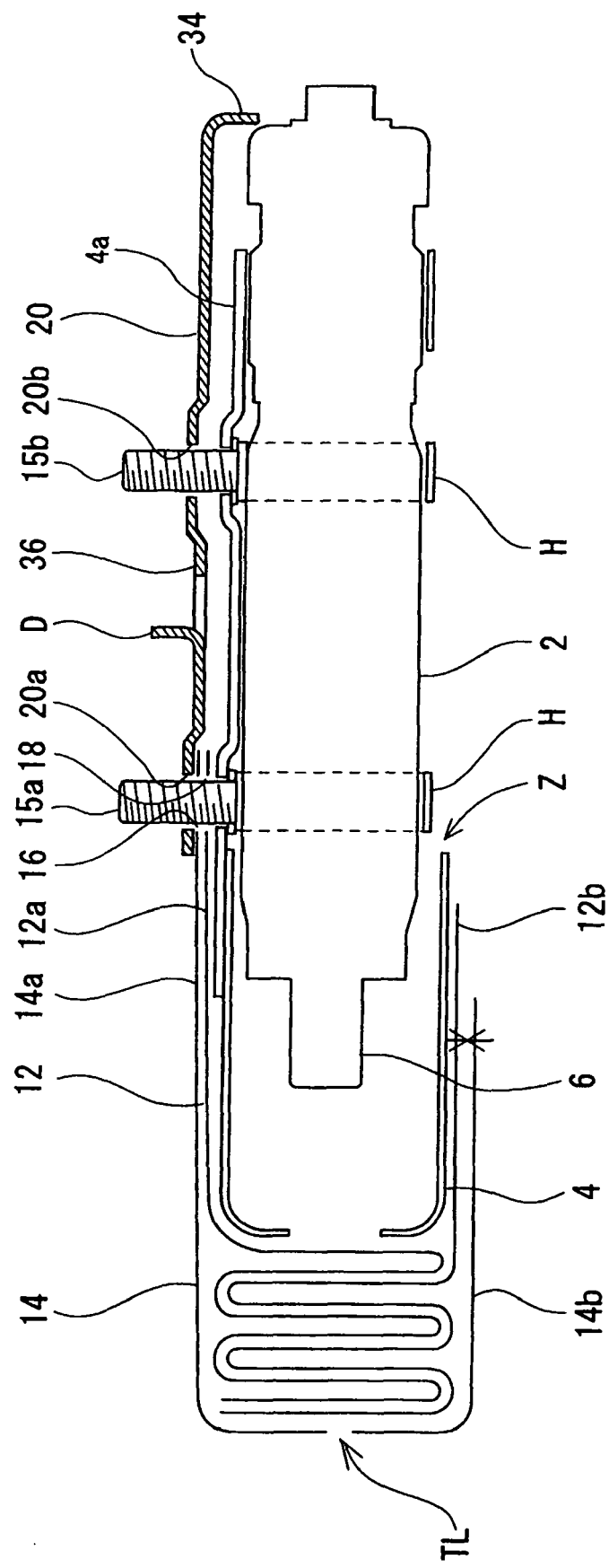
FIG. 3 is a cross-section view of the spouting portion of the inflator, showing a state that a tubular base cloth member folded in an accordion-like manner is held by a shape holding cloth in the vicinity of the spouting portion of the inflator when the inflator is not activated.
Figure 4A:
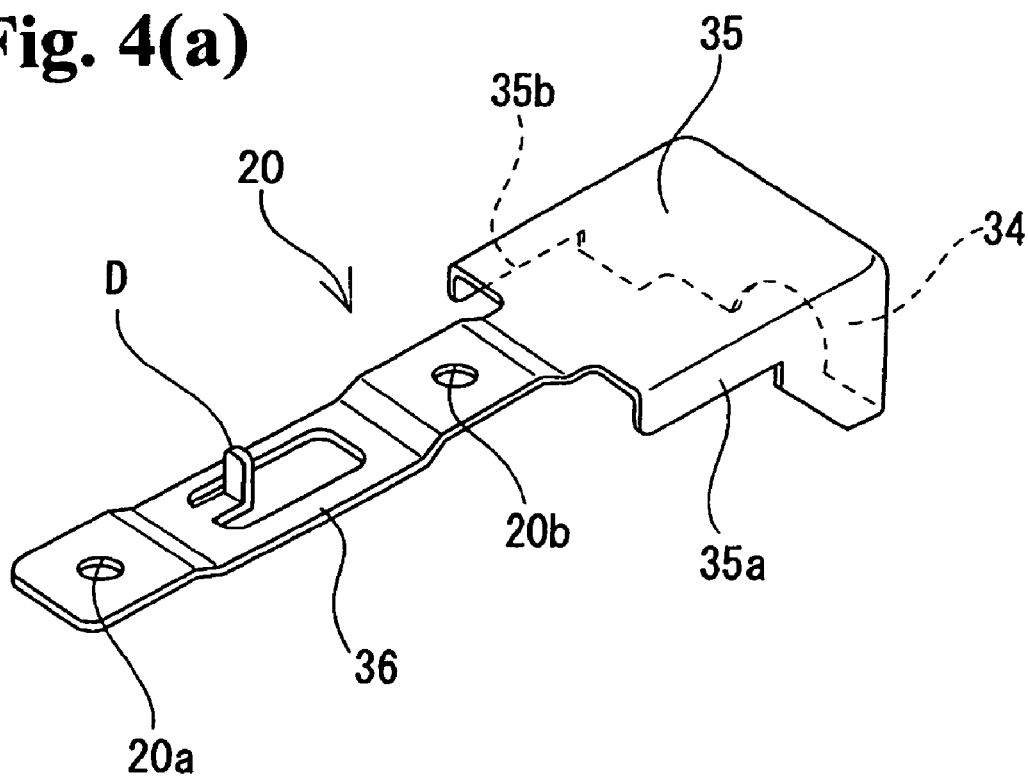
Figure 4B:
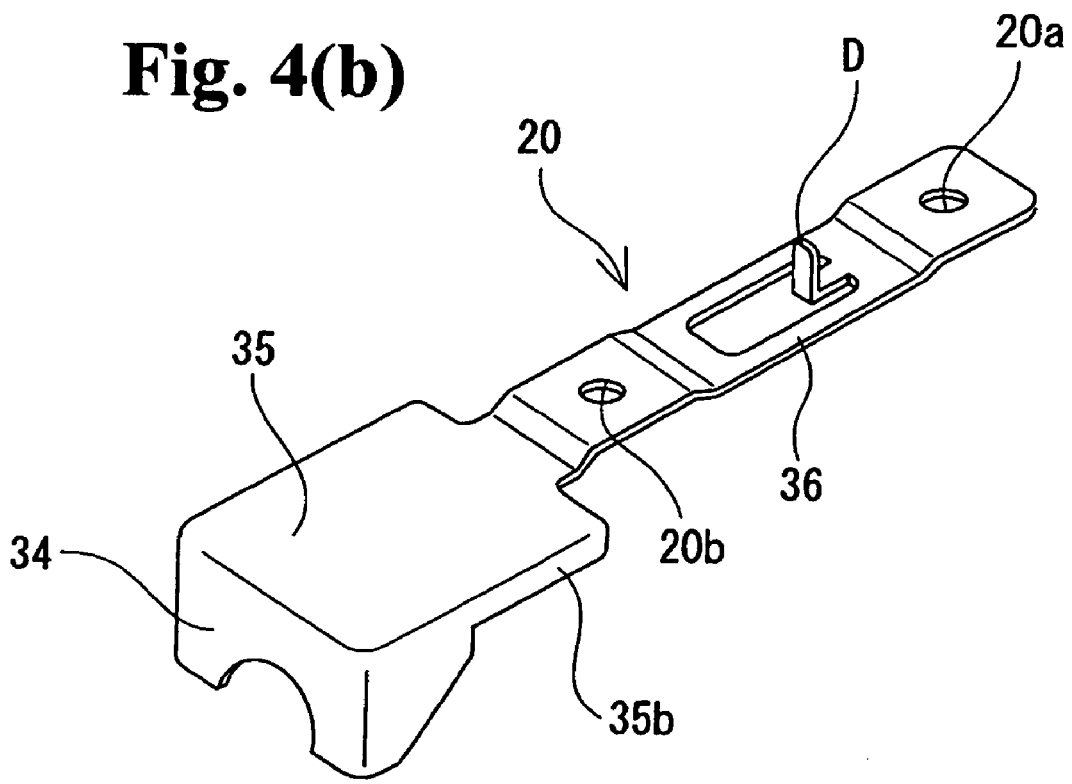
Figure 5:
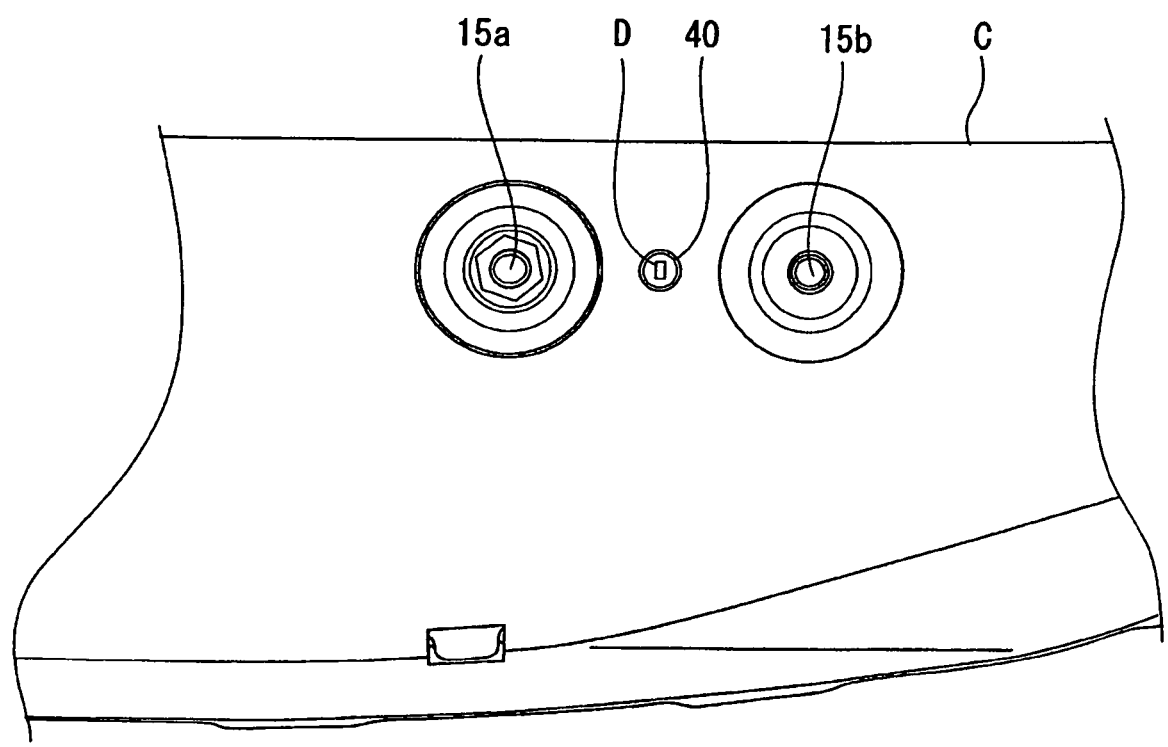
FIG. 5 is a partially magnified plan view of a casing having a hole formed at a position corresponding to that of a projecting portion of the stopper plate.

Embodiments of the present invention will now be described with reference to attached drawings. FIG. 1 is a developed plan view of a side collision airbag of this embodiment; FIG. 2 is an overall perspective view of an inflator for inflating and extending the side collision airbag; FIG. 3 is a cross-section view of the spouting portion of the inflator, showing a state that a tubular base cloth member folded in an accordion-like manner is held by a shape holding cloth in the vicinity of the spouting portion of the inflator when the inflator is not activated; FIGS. 4(a), 4(b) are perspective views of a stopper plate for restricting a movement of the inflator toward the other side in a longitudinal direction, wherein FIG. 4(a) is a perspective view of the stopper plate seen from one side in a longitudinal direction and FIG. 4(b) is a perspective view of the stopper plate seen from the other side in the longitudinal direction; and FIG. 5 is a partial magnified plan view of a casing having a hole formed at a position corresponding to that of a projecting portion of the stopper plate, the hole being designed to enable to confirm the projecting portion. Incidentally, in the side collision airbag device shown in FIG. 1, an arrow FR indicates a front side of the vehicle, and an arrow UP indicates an upward direction of the vehicle.

In FIG. 1, the side collision airbag device 1 has a bag-like side collision airbag 10 and the inflator 2, which is inserted in the side collision airbag 10 and supplies a gas for inflating and extending the side collision airbag 10.

As shown in FIG. 1, the side collision airbag 10 is composed as a bag body by stitching base cloths along the entire perimeter and sewing them together, the base cloths being formed in a substantially identical shape. Reference numeral 27 in FIG. 1 indicates the stitched and sewed portion, which is entirely double stitched along the perimeter of the bag body (incidentally, the double stitch may not be necessarily required, but a single stitch may be employed).

The side collision airbag 10 includes, in its inside, a chest portion chamber B disposed in an upper portion for restricting a movement of the chest portion (including the shoulder portion) of an occupant, a waist portion chamber W disposed in a lower portion for restricting a movement of the waist portion of the occupant, and a middle chamber M in a portion between both the chambers W and B, the middle chamber M being partitioned from the chest portion chamber B by a tether cloth 26 and a non-inflatable portion 22. In a connection passage R1 for connecting the middle chamber M and the waist portion chamber W, the inflator 2 is installed so that a gas injecting portion 6 for spouting a gas faces the side of the waist portion chamber W.

Moreover, there is formed an opening 24 passing through the airbag in a vehicle width direction (a direction vertical to the drawing in FIG. 1) between the waist portion chamber W and the middle chamber M of the side collision airbag 10. Due to this configuration, when the inflator 2 is activated, a gas, the flow rate of which is regulated to be a predetermined amount by a gas flow-out hole Y of the sleeve 4 (see FIG. 2), flows into the waist portion chamber W from the gas injecting portion 6 (see a broken line arrow P in FIG. 1), and simultaneously a gas, the flow rate of which is regulated to be a predetermined amount by a flow passage Z of the sleeve 4 (see FIG. 2), is guided to a front side in the middle chamber M from the gas injecting portion 6 by the tether cloth 26 and flows into the chest portion chamber B through a connection passage R2 for connecting the middle chamber M and the chest portion chamber B (see a broken line arrow Q in FIG. 1).

Incidentally, in the stitched and sewed portion 27, a portion constituting a periphery of the waist portion chamber W is provided with a sealing material portion 29 composed of a silicone rubber or other appropriate sealing material along the stitched and sewed portion 27 for sealing thereof. The sealing material portion 29 is designed to be wider than the double stitched and sewed portion 27 (see FIG. 1) so as to be able to cover both seams of the stitched and sewed portion 27. By this configuration, it is possible to improve a hermeticity of the waist portion chamber W and to maintain high pressure in the waist portion chamber W, which restricts the movement of the waist portion of the occupant, for a long time.

As shown in FIG. 2 and FIG. 3, the inflator 2 is provided with the tubular sleeve 4, disposed so as to cover the gas injecting portion 6, on one side in its longitudinal direction (left side in FIG. 2 and FIG. 3), which is the side of a gas spout, and is further provided with a tubular base cloth member 12 so as to cover the sleeve 4. This tubular base cloth member 12 is held by a shape holding cloth 14 in a vicinity of the gas flow-out hole Y of the sleeve 4 in a state of being folded in an accordion-like manner, as shown in FIG. 3, when the inflator is not activated.

In the tubular sleeve 4, the gas flow-out hole Y is formed at its tip to face the gas injecting portion 6 of the inflator 2, and a spouted gas, the amount of which is regulated by this gas flow-out hole Y, flows into the waist portion chamber W. On the other hand, a spouted gas that is not allowed to pass through the gas flow-out hole Y flows out from an annular clearance Z formed by an outer periphery of the main body of the inflator 2 on one side thereof in its longitudinal direction and the rim of an opening end on the other side (a right side in FIG. 2) of the above sleeve 4, the periphery of which is bigger than the above outer periphery, and flows into the middle chamber M. At that time, the outer periphery of the sleeve 4 and the sealing material portion 29 in a section of the connection passage R1 are kept in substantially close contact with each other. That is, it is configured so that the spouted gas does not leak through a clearance between them (see FIG. 1). Thus, the flow rates of gas flowing from the inflator 2 into the side of the waist portion chamber W and the side of the middle chamber M (the chest portion chamber B) are divided at an appropriate ratio.

The tubular base cloth member 12 is formed in a substantially tubular shape by stitching opposing side edges of a plane-shaped base cloth to each other at a stitch portion S, and has a function of a valve for preventing a gas from flowing back from the side of the waist portion chamber W to the side of the middle chamber M when the airbag is extended. This tubular base cloth member 12 has a securing piece 12a in an end portion on the other side (right side in FIG. 2 and FIG. 3), the securing piece 12a being elongated along the longitudinal direction of the inflator 2. The securing piece 12a is secured by the bolt 15a, which is inserted through a securing hole 18 provided in the securing piece 12a. The bolt 15a is of the spouting port side of bolts 15a, 15b of a pair of supporting members H disposed before and after of the inflator 2. In this state, a stopper plate 20 is superposed above it and is secured by the bolt 15a, which is inserted through a securing hole 20a, thereby the securing piece 12a of the tubular base cloth member 12 is sandwiched between a supporting portion 4a of the sleeve 4 and the stopper plate 20.

In addition, the shape holding cloth 14 is formed of a belt-like base cloth and, as shown in FIG. 3, is configured so that its one end 14b is secured to one end 12b of the tubular base cloth member 12 by being stitched, while at the same time its other end 14a is secured by a bolt 15a, which is inserted through a securing hole 16 formed at the other end 14a, the bolt 15a being located at the spouting port side in the bolts 15a, 15b of a pair of supporting members H disposed before and after of the inflator 2. Furthermore, a tear line TL (tear portion) is formed at a substantially midpoint portion of the shape holding cloth 14 in a direction crossing the shape holding cloth 14. When the inflator is activated, the shape holding cloth 14 is torn from this tear line TL and the tubular base cloth member 12 becomes extendable.

Next, the details of the stopper plate 20 will be described with reference to FIGS. 4(a), 4(b).

The stopper plate 20 (restricting member) is provided as a member separated from the supporting members H for supporting the inflator 2 and also from the sleeve 4 (including the supporting portion 4a). As shown in FIG. 4(a) and FIG. 4(b), the stopper plate 20 has a supporting portion 35 at an end thereof corresponding to the end portion on the side opposite to the spouting port side of the inflator 2, the supporting portion 35 having a wide rectangular shape so as to cover a part of the end portion on the other side of the inflator 2 in its longitudinal direction (end portion on the right side in FIG. 2). At the tip of the supporting portion 35, a securing portion 34 is formed by being bent vertically downwardly so as to be continuous with edge plates 35a, 35b bent downwardly from the edge of the both sides of the supporting portion and also so as to cover at least a part of the end portion on the other side of the inflator 2 in its longitudinal direction (end portion on the right side in FIG. 2). Moreover, the stopper plate 20 is elongated from the supporting portion 35 along a longitudinal direction of the inflator 2, and has a narrow strip 36 (elongated portion) in which two bolt insertion holes 20a, 20b are formed at positions corresponding to the bolts 15a, 15b (fixing members). The stopper plate 20 is secured to the inflator 2 through the strip 36 secured by the bolts 15a, 15b, which are inserted through the insertion holes 20a, 20b.

Moreover, the stopper plate 20 includes a projecting portion D formed at a midpoint portion between the two insertion holes 15a, 15b of the strip 36 so as to project toward the other side of the side where the inflator 2 is disposed. This projecting portion D is, as shown in FIG. 5, for enabling to confirm the projecting portion D from the outside through a hole 40 formed in a casing C for confirming a projecting portion D when the folded side collision airbag 10 is accommodated in the casing C, and is also for preventing the stopper plate 20 from being forgotten to be attached.

In the next place, functional effects of this embodiment constructed as described above will now be explained. That is, as described above, when the inflator 2 is activated, a gas is spouted from the gas injecting portion 6 on the one side of the inflator 2 in its longitudinal direction, and thereby the side collision airbag 10 inflates and extends between the side wall portion of the body of the vehicle and the occupant seated on the seat. At that time, in this embodiment, movement of the inflator 2 toward the other side in its longitudinal direction is restricted by the stopper plate 20. By this, the inflator 2 can be prevented from moving (displacing, projecting or the like) toward the opposite side of a spouting direction of the gas due to a reaction force caused by blowout of the gas. Therefore, the inflator 2 can be kept to be fixed stably even in the case when the inflator is activated.

In addition, particularly in the present embodiment, the stopper plate 20 is provided as a member separated from the supporting members H for supporting the inflator 2 and also from the sleeve 4 (including the supporting portion 4a). By this, it becomes possible to restructure an inflator of an existing side collision airbag device, which does not have a stopper plate 20, so as to have a function of restricting the movement of the inflator in a simple configuration by installing the stopper plate 20 afterwards.

Moreover, particularly in the present embodiment, the stopper plate 20 has the securing portion 34 provided so as to cover at least a part of the end portion on the other side of the inflator 2 in its longitudinal direction. By this configuration, when the inflator 2 is activated, the securing portion 34, which is in contact with the end portion on the other side of the inflator 2 in its longitudinal direction, can prevent the inflator 2 from moving (displacing, projecting or the like) toward the opposite side of the spouting direction of the gas.

Moreover, particularly in the present embodiment, the stopper plate 20 has the strip 36, which is elongated along the longitudinal direction of the inflator 2 and is secured by the bolts 15a, 15b for fixing the supporting members H to the body side of the vehicle. By this configuration, the stopper plate 20 is secured to the inflator 2 in such a manner that the strip 36 is secured by the bolts 15a, 15b inserted through the bolt insertion holes 20a, 20b of the strip 36. Therefore, any fixing member for fixing the stopper plate 20 to the vehicle side is not required to be separately provided, and the fixing structure can be simplified.

Moreover, particularly in the present embodiment, the stopper plate 20 has the projecting portion D provided so as to project toward the other side of the side where the inflator 2 is disposed. By this configuration, if the insertion hole 40 for confirming the projecting portion D is formed at the position corresponding to that of the projecting portion D in the side collision airbag 10 and a casing C for accommodating the side collision airbag 10 in a state of being folded, it becomes possible to confirm the projecting portion D from the outside in a state that the inflator 2 is inserted in the side collision airbag 10 and in another state that the folded side collision airbag 10 having the inflator 2 inserted therein is accommodated in the casing C. As a result, it is prevented from forgetting to attach the stopper plate 20.

Incidentally, although a case where the side collision airbag 10 is provided with the plurality of chambers (a chest portion chamber B, a waist portion chamber W and a middle chamber M in the above embodiment) is explained as an example above, the present invention is not limited to this embodiment, but is applicable to a side collision airbag constructed of a single chamber.

Additionally, although a case where the flow of spouted gas is divided by providing a sleeve 4 on the spouting side of an inflator 2 is explained as an example, the sleeve 4 is not necessarily required to be provided in obtaining an effect of stable fixation of the inflator, which is a major functional effect of the present invention. That is, the present invention can be applied even in a case where, for example, the side collision airbag has a two-chamber configuration having a waist portion chamber and a chest portion chamber, which are connected to each other on a front side, and a gas spouted from the inflator 2 flows into the waist portion chamber and then flows from the waist portion chamber into the chest portion chamber through a connection passage on the front side.

The disclosure of Japanese Patent Application No. 2007-241746, filed on Sep. 19, 2007, is incorporated in the application.

While the invention has been explained with reference to the specific embodiments of the invention, the explanation is illustrative and the invention is limited only by the appended claims.

What is claimed is:

1. A side collision airbag device, comprising:
   an airbag to inflate and extend between a side wall portion of a vehicle and an occupant seated on a seat disposed in the vehicle;
   an inflator connected to the airbag and having one longitudinal end to spout a gas for inflating the airbag and an opposite end thereof;
   a supporting member for supporting the inflator and fixing the inflator to the seat;
   a restricting member for restricting a movement of the inflator in the longitudinal direction when the inflator is activated, the restricting member being disposed at one lateral side of the inflator and having a securing portion at one end thereof to cover a part of the opposite end of the inflator to prevent movement thereof and a projecting portion projecting toward a side opposite to the one lateral side where the inflator is disposed;
   a casing for accommodating the airbag, the inflator and the restricting member, the casing having a hole, formed at a position corresponding to the projecting portion, for receiving the projecting portion therein when the restricting member is assembled so that installation of the restricting member is confirmed after the airbag, the inflator and the restricting members are assembled with the casing; and
   a sleeve covering the one longitudinal end of the inflator, a tubular base cloth member covering the sleeve, and a shape holding cloth covering the tubular base cloth member.

2. A side collision airbag device as recited in claim 1, further comprising a fixing member for fixing the supporting member to the vehicle, wherein the restricting member further comprises an elongated portion elongated along the longitudinal direction of the inflator and covering the supporting member, the elongated portion being secured by the fixing member.

3. A side collision airbag device as recited in claim 1, wherein the projecting portion is a part of the restricting member cut and bent to project toward said opposite side 4. A side collision airbag device as recited in claim 1, wherein the restricting member is formed separately from the supporting member.

5. A side collision airbag device comprising:
   an airbag to inflate and extend between a side wall portion of a vehicle and an occupant seated on a seat disposed in the vehicle;
   an inflator connected to the airbag and having one longitudinal end to spout a gas for inflating the airbag and an opposite end thereof;
   a supporting member for supporting the inflator and fixing the inflator to the seat;
   a restricting member for restricting a movement of the inflator in the longitudinal direction when the inflator is activated, the restricting member being disposed at one lateral side of the inflator and having a securing portion at one end thereof to cover a part of the opposite end of the inflator to prevent movement thereof and a projecting portion projecting toward a side opposite to the one lateral side where the inflator is disposed; and
   a casing for accommodating the airbag, the inflator and the restricting member, the casing having a hole, formed at a position corresponding to the projecting portion, for receiving the projecting portion therein when the restricting member is assembled so that installation of the restricting member is confirmed after the airbag, the inflator and the restricting members are assembled with the casing;
   wherein the securing portion has a semicircular opening for allowing a harness to be attached to the opposite end of the inflator therethrough.

6. A side collision airbag device as recited in claim 5, further comprising a fixing member for fixing the supporting member to the vehicle, wherein the restricting member further comprises an elongated portion elongated along the longitudinal direction of the inflator and covering the supporting member, the elongated portion being secured by the fixing member.

7. A side collision airbag device as recited in claim 5, wherein the projecting portion is a part of the restricting member cut and bent to project toward said opposite side.

8. A side collision airbag device as recited in claim 5, wherein the restricting member is formed separately from the supporting member.

* * * * *